United States Patent
Buard et al.

(10) Patent No.: US 6,837,624 B2
(45) Date of Patent: Jan. 4, 2005

(54) BEARING CAGE, BALL BEARING COMPRISING SUCH A CAGE AND PROCESS FOR ASSEMBLING SUCH A BEARING

(75) Inventors: Michel Buard, Saint Vallier (FR); Norbert Gabert, Saint Sorlin en Valloire (FR)

(73) Assignee: Sarma, Saint Vallier sur Rhone (FR)

( * ) Notice: Subject to any disclaimer, the term of this patent is extended or adjusted under 35 U.S.C. 154(b) by 0 days.

(21) Appl. No.: 10/024,713

(22) Filed: Dec. 21, 2001

(65) Prior Publication Data

US 2002/0081049 A1 Jun. 27, 2002

(30) Foreign Application Priority Data

Dec. 27, 2000 (FR) .............................................. 00 17123

(51) Int. Cl.[7] .............................................. F16C 33/41
(52) U.S. Cl. ........................ 384/531; 384/523; 384/507
(58) Field of Search ................................ 384/523, 524, 384/525, 526, 527, 528, 529, 530, 531, 532, 537, 544, 510, 614, 615, 507, 533, 534

(56) References Cited

U.S. PATENT DOCUMENTS

| 851,697 | A | * | 4/1907 | Schneider | 384/526 |
|---|---|---|---|---|---|
| 887,356 | A | * | 5/1908 | Straub | 384/532 |
| 924,904 | A | * | 6/1909 | Hess | 384/526 |
| 1,013,518 | A | * | 1/1912 | Schilling | 384/526 |
| 1,303,712 | A | * | 5/1919 | Newmann | 384/528 |
| 2,883,244 | A | * | 4/1959 | Berger | 384/49 |
| 3,586,405 | A | * | 6/1971 | Claesson | 384/526 |
| 4,204,717 | A | * | 5/1980 | Ernst et al. | 384/43 |
| 4,278,307 | A | * | 7/1981 | Olschewski et al. | 384/526 |
| 4,451,098 | A | * | 5/1984 | Farley et al. | 384/526 |
| 4,626,113 | A | * | 12/1986 | Forknall et al. | 384/530 |
| 4,723,851 | A | * | 2/1988 | Troster et al. | 384/523 |
| 4,804,276 | A | * | 2/1989 | Olschewski et al. | 384/526 |
| 5,015,105 | A | | 5/1991 | Ueno | |
| 5,082,375 | A | | 1/1992 | Hillmann | |
| 5,491,893 | A | | 2/1996 | Hurrell, II | |
| 5,768,060 | A | * | 6/1998 | Albrecht et al. | 360/265.2 |
| 5,941,704 | A | * | 8/1999 | Arai et al. | 433/114 |

FOREIGN PATENT DOCUMENTS

| EP | 0288334 | 3/1988 |
|---|---|---|
| GB | 227974 | 1/1925 |

* cited by examiner

*Primary Examiner*—David A. Bucci
*Assistant Examiner*—Julie K. Smith
(74) *Attorney, Agent, or Firm*—Dowell & Dowell, P.C.

(57) ABSTRACT

A ball bearing which includes a cage which defines recesses for receiving balls in a single row. The cage is in the form of a ring obtained by casting or machining and is intended to be interposed between an inner ring and an outer ring of the bearing. The cage includes recesses of a first group each having an opening for positioning a ball located on a first side of the cage, while recesses of a second group each have an opening for positioning a ball located on a second side of the cage, opposite the first side.

15 Claims, 4 Drawing Sheets

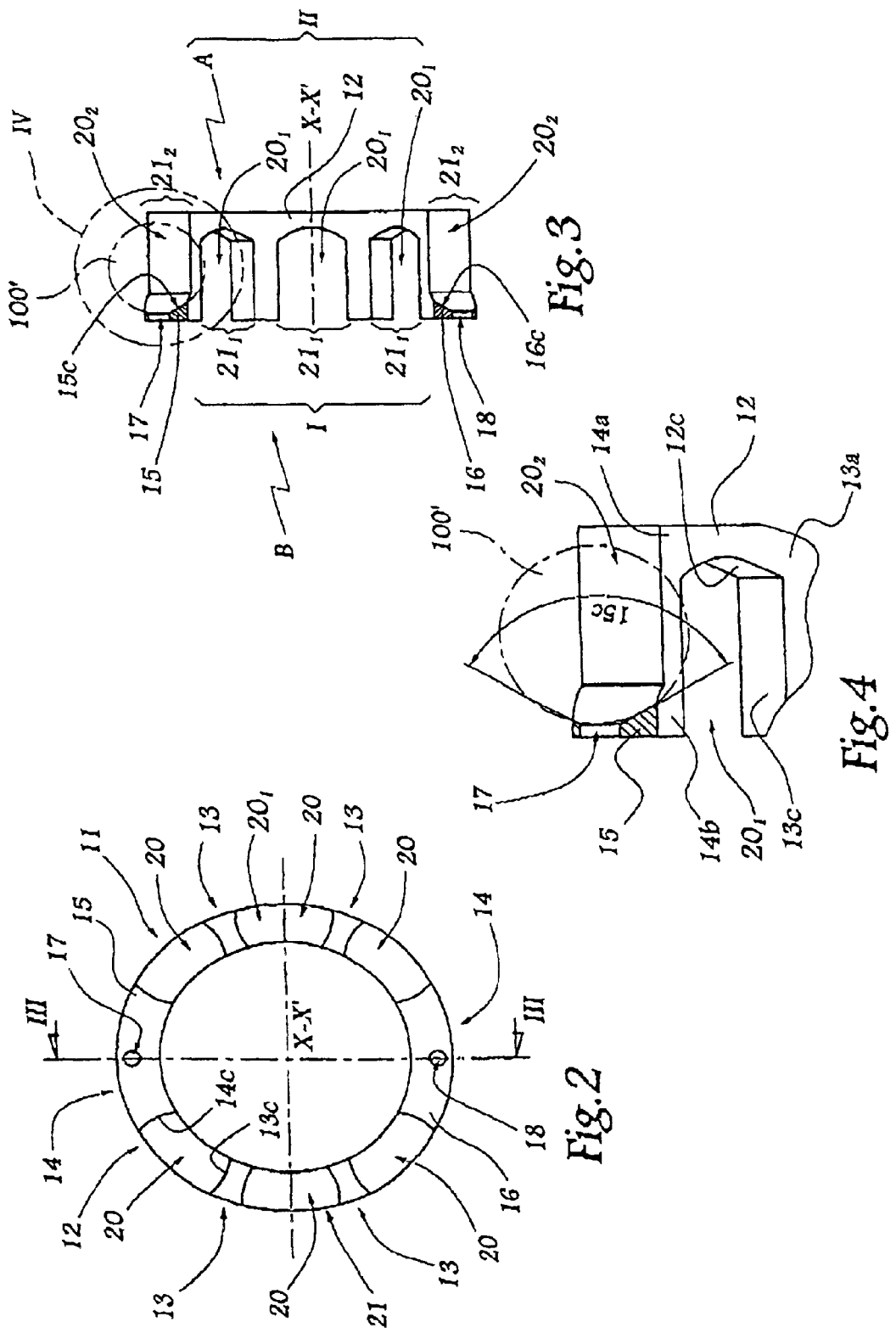

BEARING CAGE, BALL BEARING COMPRISING SUCH A CAGE AND PROCESS FOR ASSEMBLING SUCH A BEARING

BACKGROUND OF THE INVENTION

1. Field of the Invention

The present invention relates to a ball bearing cage, to a ball bearing comprising such a cage, and to a process for assembling such a bearing.

2. Description of the Related Art

In the domain of ball bearings, so-called "rigid" bearings are known, comprising a single row of balls arranged between two so-called "inner" and outer" rings, and allowing a relative movement of rotation of the inner ring with respect to the outer ring without pivoting about an axis perpendicular to the central axis of the bearing. U.S. Pat. No. 5,015,105 describes a ring-shaped cage that may be used with such bearings.

It is also known to equip such a bearing with a cage for separating the balls, such a cage defining recesses in which the balls are received, separated from one another. Such a cage is formed by two elements assembled by fastening, riveting or clipping and requiring high-precision machinings, in order not to increase friction in the bearing too greatly. The necessity of producing such a cage in two parts results from the fact that the cage must be maintained in place in the internal space of the bearing defined between the two rings, failing which it might be driven outside this space.

The different known means for assembling the two parts of a cage most often lead to an increase in the dimensions of the joints between these two parts. For example, when rivets are used, a certain quantity of matter must be provided around each rivet, in order to reduce the risks of rupture of the cage. This leads to relatively large gaps for separation between two adjacent balls and the fact that a bearing equipped with such a cage generally cannot be subjected to an intense load.

In order to allow a maximum load capacity of a bearing, it is also known to manufacture cage-less bearings which are filled with contiguous balls, this solution leads to friction between the balls, which friction may generate considerable wear of the balls, in particular when ceramic balls are used. This solution also involves a risk of the balls escaping from the internal space of the bearing as they are not maintained in place.

As it is necessary to provide a zone for positioning the balls between the rings, the balls can be driven outwardly through this sone, when the bearing is being used.

Finally, EP-A-0 288 334 discloses producing a bearing cage from a flexible band, this cage being provided with a slot which constitutes a zone of weakness of the cage that may lead to deformations likely to release the balls, particularly in the event of axial vibrations of the bearing.

It is a particular object of the present invention to overcome these drawbacks by proposing a novel bearing cage which said cage open on a second side of said cage. avoids friction between the balls and ensures that they are held in the internal volume of a bearing without requiring complex or high-precision assembly.

SUMMARY OF THE INVENTION

To that end, the invention relates to a ball bearing cage in the form of a ring obtained by machining or casting, defining recesses for receiving balls in one row and intended to be interposed between an inner ring and an outer ring of a bearing, characterized in that the recesses are distributed in two groups, each recess of the first group having an opening for positioning a ball located on a first side of the cage, while each recess of the second group has an opening for positioning a ball located on a second side of the cage, opposite the first side.

Thanks to the invention, the cage performs its role of separation of the balls efficiently and enables them to be maintained in position in the internal volume of the bearing as the balls introduced in the recesses of the second group are, to some extent, mounted in opposition with respect to the balls of the first group and act as members for maintaining the cage in the internal volume of the bearing, without requiring complex means for connecting two parts of a cage. The cage of the invention does not necessitate reserving a large volume for assembling two parts, which allows a high density of balls to be implanted, the number of balls of a bearing of given diameter being close to that of a cage-less bearing, which allows a bearing equipped with a cage according to the invention to be used under a high load.

According to advantageous aspects of the invention, the cage incorporates one or more of the following characteristics:

Each recess is defined between two arms and a bottom, the arms extending, when the cage is in configuration mounted in a bearing, in a direction substantially parallel to an axis of rotation of the bearing, while the bottom is substantially perpendicular to this axis. Certain of the arms define two adjacent recesses belonging to the same group of recesses, these arms each comprising a first end adjacent the respective bottoms of the adjacent recesses and a second free end. Certain other arms define two adjacent recesses belonging to the afore-mentioned two groups of recesses, these arms comprising a first end adjacent the bottom of one of the two adjacent recesses and a second end adjacent the bottom of the other adjacent recess.

The bottom of the recesses of a group of recesses is pierced with an orifice for passage of a member for extracting balls in place in these recesses.

The arms separating the recesses each form two concave surfaces oriented towards two adjacent recesses and adapted to cooperate with the outer surface of the balls.

The first group of recesses comprises all the recesses except two, while the second group comprises two diametrally opposite recesses.

The cage is cast or machined in one piece, of metal or a composite material.

The invention also relates to a ball bearing comprising a single row of balls, disposed between an inner ring and an outer ring, and a cage such as described hereinbefore.

Such a bearing is easier to assemble than a bearing with cage of the prior state of the art, while its cost is lower and it can operate under a greater load.

In addition, at least one of the rings may be provided with at least one notch for introduction of the balls in an internal volume defined between races formed respectively on the inner and outer rings.

Finally, the invention relates to a process for assembling a ball bearing which comprises a single row of balls, disposed between an inner ring and an outer ring, and a cage defining recesses for receiving the balls, in which process balls are introduced in a volume defined between races formed respectively on the inner and outer rings. This process is characterized in that it comprises the following steps of:

introducing in the afore-mentioned internal volume and via at least one notch made on one side of the bearing, a number of balls less than the nominal number of balls of the bearing, positioning the cage by causing the balls, already in place in the volume, to penetrate in recesses in the cage open on a first side of the cage, and introducing, via the or each afore-mentioned notch, a ball in at least one recess of the cage open on a second side of the cage.

The introduction of the or each ball in the or each recess open on the second side of the cage makes it possible to maintain the cage in position in the internal volume of the bearing without necessitating the use of blocking members or added parts.

BRIEF DESCRIPTION OF THE DRAWINGS

The invention will be more readily understood on reading the following description of an embodiment of a cage and a bearing in accordance with its principle, given solely by way of example and made with reference to the accompanying drawings, in which:

FIG. 2 is a side view on a smaller scale of the cage of FIG. 1.

FIG. 3 is a section along line III—III of FIG. 2.

FIG. 4 is a view on a larger scale of detail IV in FIG. 3.

DESCRIPTION OF PREFERRED EMBODIMENT

Figure 1:
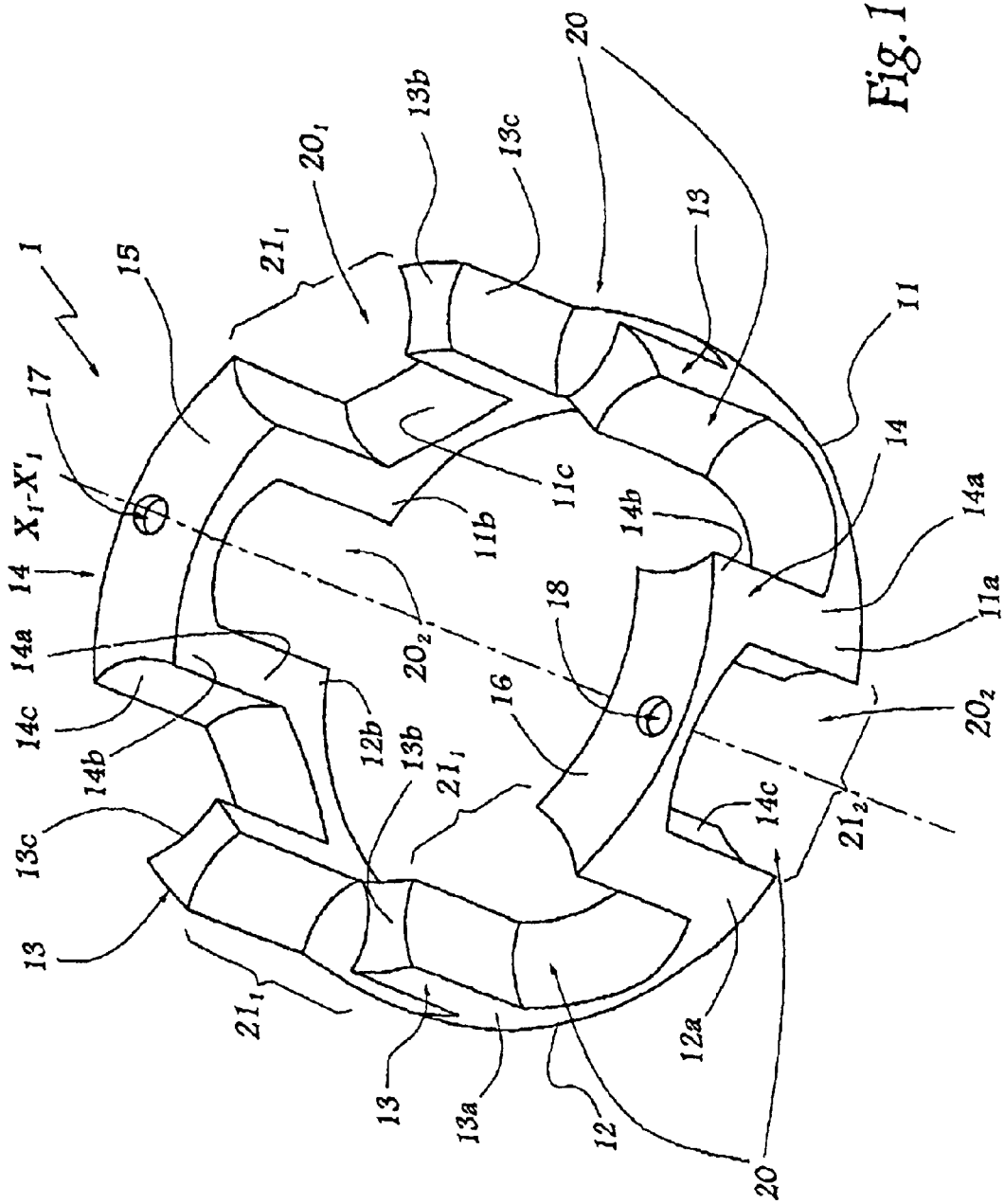
FIG. 1 is a view in perspective of a bearing cage according to the invention.

Referring now to the drawings, the cage 1 according to the invention is obtained by machining steel. The ring 1 might equally well be cast. It is a rigid structure which enables balls to be efficiently maintained in position, including in the event of vibrations of the bearing in which it is mounted.

The ring 1 is centred about an axis $X_1$—$X'_1$ and comprises two arcs 11 and 12 from which arms 13 substantially parallel to axis $X_1$—$X'_1$ extend. Arms 14 extend from the ends 11a, 11b, 12a and 12b of the arcs 11 and 12. The arms 14 are connected, opposite arcs 11 and 12, by bridges 15 and 16. The elements 11, 12, 15 and 16 are substantially perpendicular to axis $X_1$—$X'_1$.

13a and 14a respectively denote the ends of the arms 13 and 14 connected to the arcs 11 and 12. 13b and 14b respectively denote the ends of the arms 13 and 14 opposite the ends 13a and 14a. The ends 13b are free, i.e. are not joined to an arc, while ends 14b of arms 14 are joined to the bridges 15 and 16.

The bridges 15 and 16 are each pierced with an orifice 17, 18, respectively, in their central part.

Recesses 20 are defined between the arms 13 and 14. More specifically, recesses $20_1$ belonging to a first group I of recesses are formed between two adjacent arms 13 or between an arm 13 and an arm 14 and their respective bottoms are constituted by one of the arcs 11 or 12. The opening $21_1$ of each recess $20_1$ of this first group faces upwardly in FIG. 1.

In the example shown, the cage 1 comprises two series of three recesses $10_1$ defined opposite the arcs 11 and 12.

Two recesses $20_2$ belonging to a second group II of recesses, are defined between two arms 14 and their respective bottoms are constituted by the bridges 15 and 16. The openings $21_2$ of these recesses are oriented downwardly in FIG. 1, i.e. contrary to the openings $21_1$ of the recesses of the first group I.

A denotes the side of the cage 1 visible from underneath in FIG. 1 and on the right of FIG. 3. The respective openings $21_2$ of the recesses $20_2$ open out on side A of the cage 1.

B denotes the side of the cage 1 by which it is seen in FIG. 2; this side is opposite side A. The respective openings $21_1$ of the recesses $20_1$ open out on this side B.

The lateral faces 13c and 14c of the arms 13 and 14 are concave, with a radius of curvature greater than or equal to the radius of the balls 100 intended to be introduced in the recesses 20 through the openings $21_1$, $21_2$.

The bottoms of the recesses 20 are also concave, as will be seen in FIG. 4. Towards a recess $20_2$, the bridge 15 presents a concave surface 15c with, in transverse section, the shape of an open V allowing partial engagement of a ball.

The situation is similar concerning the arcs 11 and 12 and the bridge 16 of which the surfaces 11c, 12c and 16c are also concave at the level of the bottoms of the recesses 20.

Figure 5:
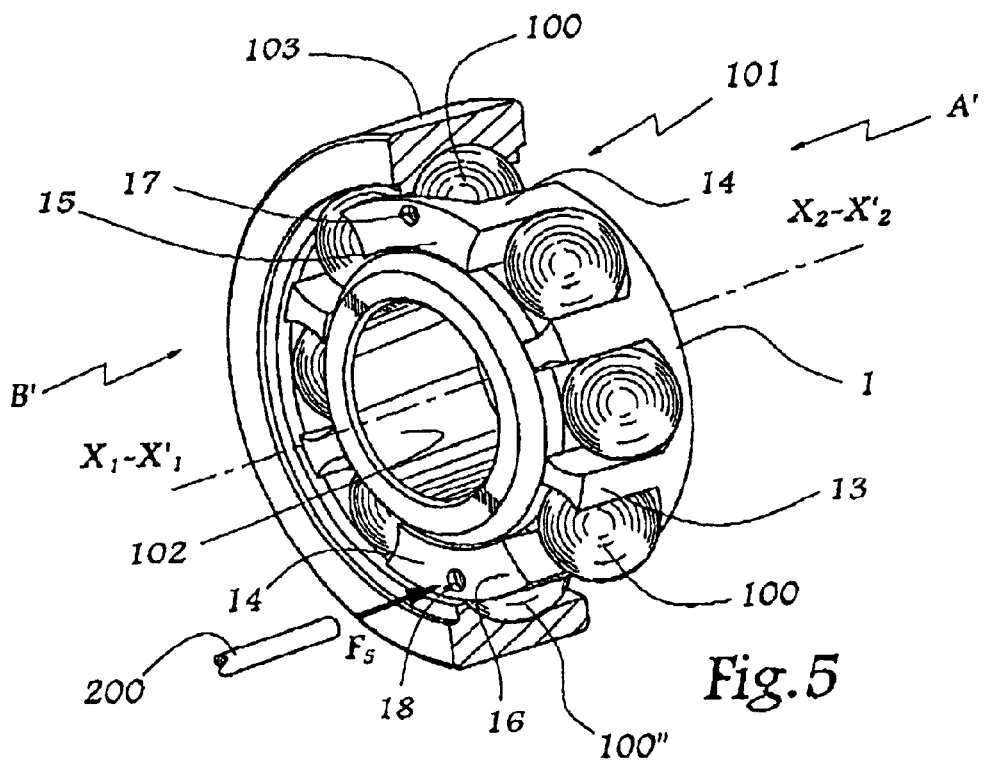
FIG. 5 is a view in perspective with parts torn away of a ball bearing according to the invention.
Figure 6:
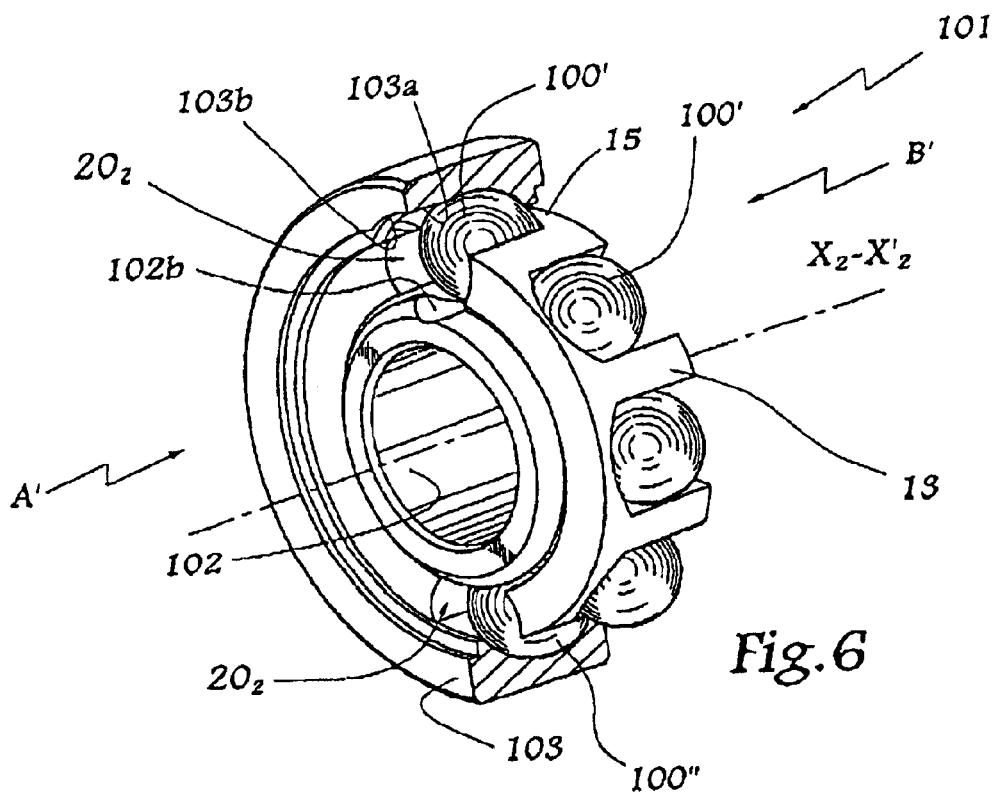
FIG. 6 is a view similar to FIG. 5, the bearing being seen from the opposite side.
Figure 7:
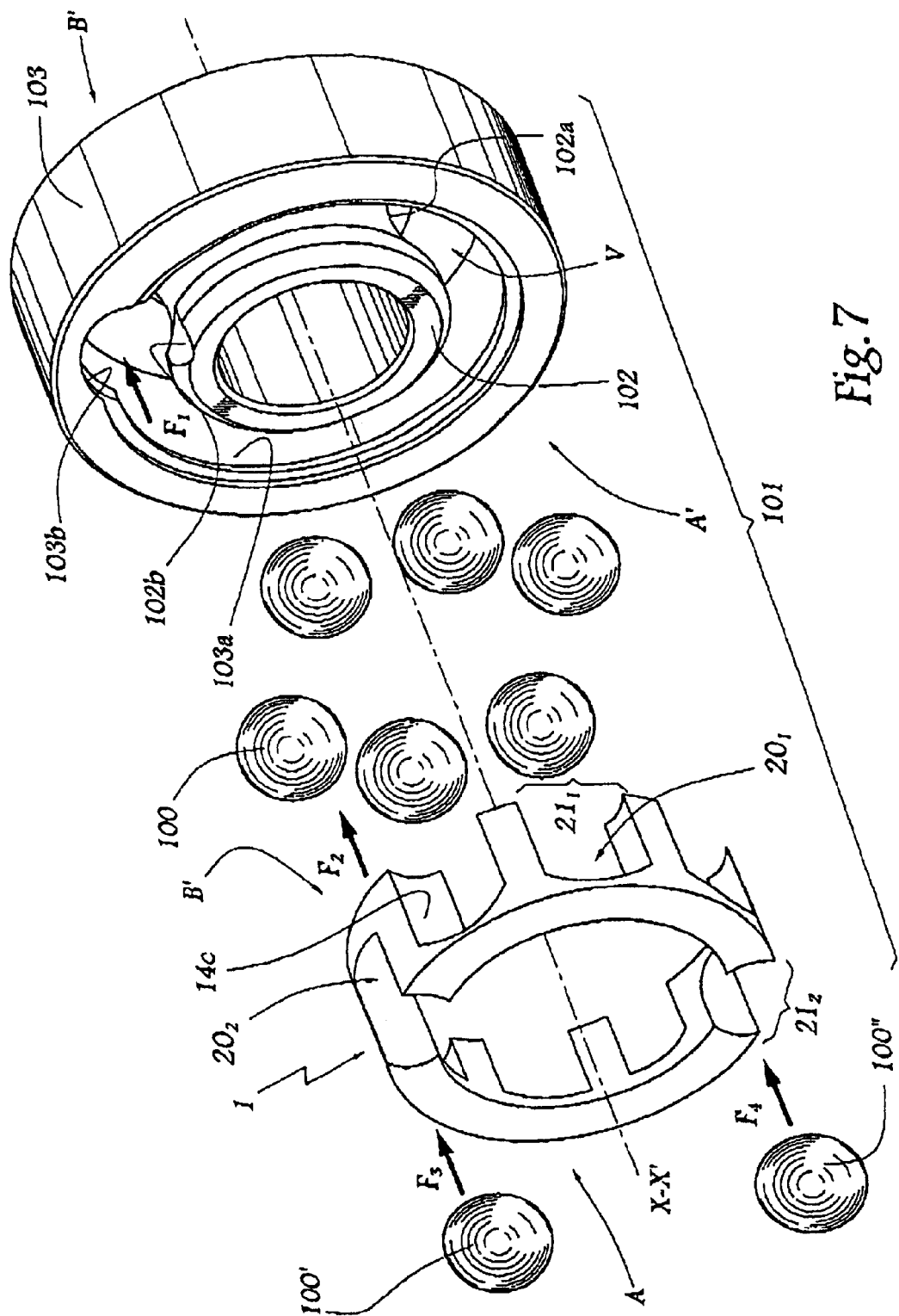
FIG. 7 is an exploded view in perspective of the bearing of FIGS. 5 and 6, from the same side as FIG. 6.

As is more particularly visible in FIGS. 5 to 7, a bearing 101 according to the invention comprises an inner ring 102 and an outer ring 103 centred on an axis $X_2$—$X'_2$ which is the axis of rotation of the bearing. When the bearing is in mounted configuration shown in FIGS. 5 and 6, the axes $X_1$—$X'_1$ and $X_2$—$X'_2$ merge.

The inner ring 102 defines a race 102a for balls 100, this race 102a being formed by the outer radial surface of the ring 102. The inner radial surface of the ring 103 also defines a race 103a for balls 100. V denotes the internal volume of the bearing 101 included between races 102a and 103a. A' denotes the side of the bearing 101 shown on the left-hand side of FIGS. 6 and 7 and B' the side of this bearing shown on the left-hand side of FIG. 5.

On side A' of the bearing, the rings 102 and 103 are each provided with a notch 102b, 103b allowing the successive introduction of the balls 100 in the volume V, as represented by arrow $F_1$ in FIG. 7.

When the bearing 101 is to be assembled, six balls 100 are introduced in the volume V, via the opening made at the level of the notches 102b and 103b. The cage 1 is then introduced in the bearing 101, as represented by arrow $F_2$, the balls 100 being distributed in the six recesses $20_1$ of the first group I of recesses 20.

A ball 100' is then positioned, via side A' of the bearing, in the recess $20_2$ shown in the upper part of FIG. 7, this being represented by the arrow $F_3$. The cage 1 is then rotated about axes $X_1$—$X'_1$ and $X_2$—$X'_2$. The angle of rotation of the cage is about 180°, which makes it possible to bring the second recess $10_2$ of the second group II opposite the notches 102b and 103b and to introduce a second ball 100" in this notch as represented by arrow $F_4$. It is then possible to impart to the ring 1 a fresh movement of rotation in order to move ball 100" away from the notches 102b and 103b.

Due to the positioning of the balls 100' and 100", the cage 1 is maintained in position in the volume V and efficiently performs its function of separation and distribution of the efforts between the balls 100, 100' and 100" without it being necessary to add a blocking piece on this cage.

When the bearing 101 is to be dismantled, the balls 100' and 100" are driven from the recesses $20_2$ by bringing these recesses successively opposite the notches 102b and 103b and by exerting a thrust on the balls by means of a rod 200 passing through an orifice 17 or 18, as schematically represented by arrow $F_5$ in FIG. 5.

What is claimed is:

1. A ball bearing cage adapted to be positioned between an inner bearing ring and an outer bearing ring, the cage including a machined or cast and rigid annular ring member having first and second oppositely oriented sides, a plurality of first recesses provided in spaced relationship with respect to one another in said first side of said ring member, each of said first recesses being of a configuration to cooperatively receive a single ball therein, a plurality of second recesses provided in spaced relationship with one another in said second side of said ring member and each of said second recesses being of a configuration to cooperatively receive a single ball therein, such that said balls are aligned in a single annular row within said ring member, and first and second groups of first recesses spaced between two diametrally opposite second recesses.

2. The cage of claim 1, wherein each of said first and second recesses is defined between two arms and a bottom, said arms extending in a direction substantially parallel to a central axis of rotation ($X_1$—$X'_1$) of said ring member, while said bottom is substantially perpendicular to said central axis.

3. The cage of claim 2, wherein certain of said arms define two adjacent of said first recesses, said certain of said arms each comprising a first end adjacent the respective bottoms of said adjacent recesses and a second free end.

4. The cage of claim 2, wherein certain of said arms define two adjacent first and second recesses, said certain of said arms comprising a first end adjacent the bottom of one of said two adjacent first and second recesses and a second end adjacent the bottom of the other adjacent first and second recess.

5. The cage of claim 2 wherein the bottom of the second recesses includes an orifice for passage of a member for extracting balls in place in said second recesses.

6. The cage of claim 2, wherein said arms defining each of said first and second recesses each have concave surfaces oriented towards one another and adapted to cooperate with an outer surface of a ball.

7. The cage of claim 1, wherein said ring member is cast or machined in one continuous annular piece.

8. The cage of claim 1 wherein said first recesses are in spaced offset relationship with respect to said second recesses about said ring member.

9. The cage of claim 8 wherein each of said second recesses is defined by opposite arms and a bottom wall, and an opening through each of said bottom walls communicating with said first side of said ring member whereby a tool may be inserted through said openings to eject balls positioned within said second recesses.

10. The cage of claim 1 wherein each of said second recesses is defined by opposite arms and a bottom wall, and an opening through each of said bottom walls communicating with said first side of said ring member, whereby a tool may be inserted through said openings to eject balls positioned within said second recesses.

11. A ball bearing including an inner bearing ring and an outer bearing ring between which is seated a ball bearing cage, said ball bearing cage including a machined or cast and rigid annular ring member having first and second oppositely oriented sides, a plurality of first recesses provided in spaced relationship with respect to one another in said first side of said ring member, each of said first recesses being of a configuration to cooperatively receive a single ball therein, a plurality of second recesses provided in spaced relationship with one another in said second side of said ring member and each of said second recesses being of a configuration to cooperatively receive a single ball therein, such that said balls are aligned in a single annular row within said ring member, first and second groups of first recesses spaced between two diametrally opposite second recesses.

12. The ball bearing of claim 11 wherein said inner bearing ring defines an inner bearing race and said outer bearing ring defines an outer bearing race opposing said inner bearing race, and at least one notch in one of said inner and outer bearing rings for introducing said balls between said inner and outer bearing races.

13. The ball bearing of claim 12 wherein said first recesses are in spaced offset relationship with respect to said second recesses about said ring member.

14. The ball bearing of claim 13 wherein each of said second recesses is defined by opposite arms and a bottom wall, and an opening through each of said bottom walls communicating with said first side of said ring member, whereby a tool may be inserted through said openings to eject balls positioned within said second recesses.

15. The ball bearing of claim 11 wherein each of said second recesses is defined by opposite arms and a bottom wall, and an opening through each of said bottom walls communicating with said first side of said ring member, whereby a tool may be inserted through said openings to eject balls positioned within said second recesses.

* * * * *